A. Rock,
Tanning App's.
No. 112,285. Patented Feb. 28, 1871.
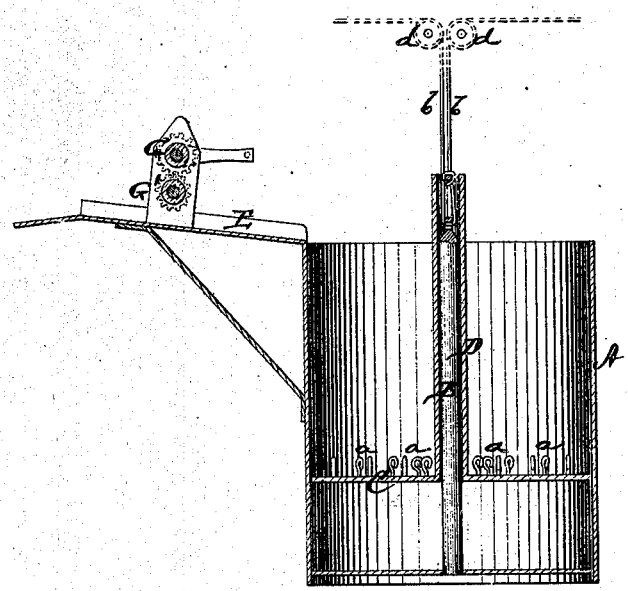
Witnesses
John A. Ellis
G. V. White
Inventor
Adolphe Rock
Per
T. H. Alexander
Atty

UNITED STATES PATENT OFFICE.

ADOLPHE ROCK, OF NEW ORLEANS, LOUISIANA.

IMPROVEMENT IN PROCESSES AND APPARATUS FOR CURING HIDES.

Specification forming part of Letters Patent No. 112,285, dated February 28, 1871.

*To all whom it may concern:*

Be it known that I, ADOLPHE ROCK, of New Orleans, in the parish of Orleans and State of Louisiana, have invented certain new and useful Improvements in the Process and Apparatus for Preserving and Curing-Hides; and I do hereby declare that the following is a full, clear, and exact description thereof, reference being had to the accompanying drawing and to the letters of reference marked thereon which form a part of this specification.

The nature of my invention consists in a "composition and apparatus for preserving and curing hides," as will be hereinafter fully set forth.

In order to enable others skilled in the art to which my invention appertains to make and use the same, I will now proceed to describe my compound, and how the same is prepared, as well as the apparatus in which the same is used, referring to the annexed drawing, which represents a longitudinal vertical section of the apparatus.

My compound is prepared in the following manner: To one hundred gallons of the crude pyroligneous acid I add one gallon of concentrated glycerine. The object of this is, the action of light separates from the pyroligneous acid some tarry, resinous matter, part of this adhering to the bottom and sides of the vessel containing the acid, and some parts floating on the surface; and when diluting the acid with water the dilution accelerates the precipitation of these resinous parts, and thus doubly weakens its preservative qualities, while the presence of glycerine keeps them in solution. For one hundred and one gallons of this mixture I add about one and one-half pound of commercial crystallized carbolic acid, which acts to prevent the hides from getting mildewed when packed or transported while wet.

My compound is thus composed of the following ingredients: One hundred gallons pyroligneous acid, one gallon concentrated glycerine, one and one-half to two and one-half pounds crystallized carbolic acid, and one hundred gallons of water. I do not confine myself, however, to these proportions, as they may perhaps be varied. For instance, the proportion of glycerine may be increased to four or five gallons, although, in practice, I have found one gallon sufficient for all necessary purposes. The greater amount of glycerine the more pliable will be the hide.

The hides, when preserved for tanning purposes, will be sufficiently cured after fifteen or twenty minutes' immersion in the above liquid or compound. They will be pliable, so as to be easily packed into bundles, rolls, &c., have no offensive smell, and will not get moldy or sour. For all those purposes for which a raw-hide is employed, the one prepared by my process will be much preferable for the above reasons.

The hides may be rendered more or less pliable by a longer or shorter duration of the immersion. In tanning a hide prepared with this compound it will take less tannin to render it as good as those salted or dried in the usual manner. If pyroligneous acid alone was used, the hides would become hard and horny, with resinous matters adhering to them; would, after an exposure to the air, turn black and altogether unfit for tanning; also, the liquid itself would soon become exhausted, so that, practically, it would be dearer than salting.

The apparatus I employ is constructed in the following manner: A represents a tank or vessel of any suitable dimensions, or a cistern, in the center of which is an upright shaft, B. C is a piston-head, provided in the center with a tube, D, large enough to allow the shaft B to pass through the same. On the upper side of the piston C a number of hooks, *a a*, on which the hides are fastened. Two ropes, *b b*, pass through the two pulleys *d d*, above the cistern, said ropes being so arranged that, by means of one of them, the piston, with the hides attached, is drawn down, immersing the hides in the liquid or compound above described, while with the other rope they are drawn up again. Also, by means of these ropes, the piston may be worked up and down to stir the liquid; or, a pitman may be attached to the tube or sleeve D of the piston, and to a crank or an eccentric, to perform the same service. All the metallic parts of the apparatus must be made of brass, copper, or well-galvanized iron, as the acid, coming in contact with ungalvanized iron, would corrode the same, and the peroxyde and protoxide of iron thus formed would blacken the hides. When the hides are considered sufficiently cured they are passed between the rollers G G', arranged on a platform, E, at the side of the cistern, to rinse out the superfluous liquid, and the hides may be left a day or two to dry, or may be immediately packed for transportation. The upper roller G may have springs so arranged that it may yield and accommodate itself to the various thicknesses of the hides.

Having thus fully described my invention, what I claim as new, and desire to secure by Letters Patent, is—

1. The within-described compound or liquid, composed of the ingredients substantially as set forth.

2. The method herein described of preserving and curing hides by means of immersing the same in a liquid composed of pyroligneous acid, glycerine, crystallized carbolic acid, and water, substantially as herein set forth.

3. The piston C, with sleeve D and hooks $a$ $a$, constructed and arranged substantially as and for the purposes herein set forth.

4. The combination of the cistern A, shaft B, piston C, sleeve D, hooks $a$ $a$, platform E, rollers G G', and a suitable mechanism for raising and lowering the piston, substantially as and for the purposes herein set forth.

In testimony that I claim the foregoing as my own I affix my signature in presence of two witnesses.

ADOLPHE ROCK.

Witnesses:
T. H. ALEXANDER,
J. V. WHITE.